(12) United States Patent
Chow et al.

(10) Patent No.: US 6,856,996 B2
(45) Date of Patent: Feb. 15, 2005

(54) METHOD, SYSTEM, AND PROGRAM FOR ACCESSING ROWS IN ONE OR MORE TABLES SATISFYING A SEARCH CRITERIA

(75) Inventors: Jyh-Herng Chow, San Jose, CA (US); Ting Yu Leung, San Jose, CA (US); Thanh Tan Pham, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 09/822,899

(22) Filed: Mar. 30, 2001

(65) Prior Publication Data

US 2002/0143751 A1 Oct. 3, 2002

(51) Int. Cl.$^7$ .......................... G06F 17/00; G06F 17/30
(52) U.S. Cl. .......................... 707/102; 707/101; 707/2; 707/3
(58) Field of Search ............................. 707/101, 100, 707/102, 3, 2

(56) References Cited

U.S. PATENT DOCUMENTS

| | | |
|---|---|---|
| 4,190,835 A | 2/1980 | Buynak |
| 4,221,003 A | 9/1980 | Chang et al. |
| 4,434,475 A | 2/1984 | McCaskill et al. |
| 5,097,408 A | 3/1992 | Huber |
| 5,241,648 A | 8/1993 | Cheng et al. |
| 5,276,870 A | 1/1994 | Shan et al. |
| 5,396,623 A | 3/1995 | McCall et al. |
| 5,410,693 A | 4/1995 | Yu et al. |
| 5,412,805 A | 5/1995 | Jordan, II et al. |
| 5,446,858 A | 8/1995 | Copeland et al. |
| 5,450,581 A | 9/1995 | Bergen et al. |
| 5,546,576 A | 8/1996 | Cochrane et al. |
| 5,579,515 A | 11/1996 | Hintz et al. |
| 5,581,275 A | 12/1996 | Glei et al. |
| 5,590,319 A | 12/1996 | Cohen et al. |
| 5,724,575 A | 3/1998 | Hoover et al. |
| 5,739,817 A | 4/1998 | Glei et al. |
| 5,742,806 A | 4/1998 | Reiner et al. |
| 5,758,357 A | 5/1998 | Barry et al. |
| 5,819,268 A | 10/1998 | Hackett |
| 5,887,274 A | 3/1999 | Barry et al. |
| 5,930,795 A | 7/1999 | Chen et al. |
| 5,963,936 A | 10/1999 | Cochrane et al. |
| 5,974,407 A | 10/1999 | Sacks |
| 5,987,472 A | 11/1999 | Serafin |

(List continued on next page.)

FOREIGN PATENT DOCUMENTS

| | | |
|---|---|---|
| JP | 63071741 | 4/1988 |
| JP | 1009546 | 1/1989 |
| JP | 5225250 | 9/1993 |
| WO | WO 9857279 | 12/1998 |
| WO | WO 9927679 | 6/1999 |

OTHER PUBLICATIONS

Terry et al, "Continuous queries over append–only databases", ACM 1992, pp. 321–330.*

U.S. patent application Ser. No. 09/656,558, filed on Sep. 7, 2000, entitled, "Method, System And Program For Implementing Scrollable Cursors In A Database", invented by MA Bernal, et al.

(List continued on next page.)

*Primary Examiner*—Uyen Le
(74) *Attorney, Agent, or Firm*—David W. Victor; Konrad, Raynes & Victor LLP

(57) ABSTRACT

Provided is a method, system, and program for accessing rows of data from a base table satisfying a search criteria. An initial request to access rows in the base table is received, including the search criteria specifying predicates for one or more columns in the base table. A data structure is generated to include information on qualifying base table rows that satisfy the search criteria. Notification is provided that the qualifying base table rows are accessible before information on all the qualifying base table rows is included in the data structure. A request is then received for one qualifying base table row. A determination is made as to whether the data structure includes information on the requested qualifying base table row. If so, the information in the data structure is used to provide access to the requested qualifying base table row.

45 Claims, 8 Drawing Sheets

U.S. PATENT DOCUMENTS

| | | | |
|---|---|---|---|
| 6,092,062 A | | 7/2000 | Lohman et al. |
| 6,212,514 B1 | | 4/2001 | Eberhard et al. |
| 6,223,420 B1 | | 5/2001 | Lee et al. |
| 6,523,040 B1 | * | 2/2003 | Lo et al. .................... 707/101 |
| 6,665,678 B2 | * | 12/2003 | Ching Chen et al. ........ 707/100 |
| 2002/0026524 A1 | * | 2/2002 | Dharap ........................ 709/236 |
| 2002/0029212 A1 | * | 3/2002 | Chen et al. ..................... 707/3 |

OTHER PUBLICATIONS

Preliminary Amendment submitted in application Ser. No. 09/915,869, filed on Jul. 26, 2001.

Preliminary Amendment submitted in application Ser. No. 09/915,866, filed on Jul. 26, 2001.

Preliminary Amendment submitted in application Ser. No. 09/915,868, filed on Jul. 26, 2001.

Preliminary Amendment submitted in application Ser. No. 09/915,783, filed on Jul. 26, 2001.

Preliminary Amendment submitted in application Ser. No. 09/915,867, filed on Jul. 26, 2001.

U.S. patent application Ser. No. 09/365,953, filed on Aug. 8, 1999, entitled, "Automatic Pruning For Log–Based Replication", invented by IT Ieong and PL Shimer.

U.S. patent application Ser. No. 09/325,661, filed on Jun. 2, 1999, Prov filed Oct. 8, 1998, entitled, "Database Extender For Storing, Querying, and Retrieving Structured Documents", invented by DT Chang; JH Chow; J Xu; and JM Cheng.

U.S. patent application Ser. No. 09/324,499, filed on Jun. 2, 1999, Prov filed Oct. 8, 1998, entitled, "Method and Apparatus For Indexing Structured Documents With Rich Data Types", invented by YC Fuh; JH Chow; J Xu; and JM Cheng.

U.S. patent application Ser. No. 09/324,827, filed on Jun. 2, 1999, Prov filed Oct. 8, 1998, entitled, "Method and Apparatus For Querying Structured Documents Using A Database Extender", invented by JH Chow; J Xu; and JM Cheng.

U.S. patent application Ser. No. 09/466,862, filed on Dec. 17, 1999, entitled, "Support For Summary Tables In A Heterogeneous Database Environment", invented by RJ Cochrane; JC Kleewein; TY Leung; MH Pirahesh; N. Subramanian; and S. Venkataraman.

IBM, Corp., "New Options for FETCH in SQL", Technical Disclosure Bulletin, vol. 36, No. 06A, Jun. 1993, pp. 559–560.

IBM, Corp., "Dynamic Ordering of Joined Rows using Fields from MultipleTables", Technical Disclosure Bulletin, vol. 36, No. 11, Nov. 1993, pp. 363–366.

IBM, Corp., "Orderable, Updatable, Scrollabel Structured Query Language Cursors", Technical Disclosure Bulletin, vol. 38, No. 07, Jul. 1995, pp. 393–394.

IBM, Corp., "Updateable Scrollable Cursors", Technical Disclosure Bulletin, vol. 36, No. 04, Apr. 1993, pp. 263–268.

IBM, Corp., "Technique to Allow DB2 Utilities and Commands to Run While SQL Applications have a Table Space Locked", Technical Disclosure Bulletin, vol. 36, No. 09A, Sep. 1993, pp. 499–502.

IBM, Corp., "Administration Guide: Performance" Version 6 from IBM DB2 Universal Database, Reference SC09–2840–00, 1999, pp. 219–226.

Microsoft Corp., "Forward–only Cursors" [online], 2000, pp. 1. [Retrieved on Jun. 24, 2000]. Retrieved from the Internet at <URL: http://msdn.microsoft.com/library/psdk/sql/8_con_07_10.htm>.

Microsoft Corp., "Types of Cursors" [online], 2000, pp. 1–3. [Retrieved on Jun. 24, 2000]. Retrieved from the Internet at <URL: http://msdn.microsoft.com/library/partbook/vb6/typesofcursors.htm.>.

Microsoft Corp., "Controlling Cursor Behavior" [online], 2000, pp. 1. [Retrieved on Jun. 24, 2000]. Retrieved from the Internet at <URL: http://msdn.microsoft.com/library/psdk/sql/8_con_07_8.htm.>.

Microsoft Corp., "MDAC 2.5 SDK–ODBC Programmer's Reference Chapter 3: ODBC Architecture" [online], 2000, pp. 1–2. [Retrieved on Jun. 24, 2000] Retrieved from the Internet at <URL:http://msdn.microsoft.com/library/psdk/dasdk/odch6gh1.htm.>.

Microsoft Corp., "MDAC 2.5 SDK–ODBC Programmer's Reference Chapter 17: Programming Considerations" [online], 2000, pp. 1–6. [Retrieved on Jun. 24, 2000] Retrieved from the Internet at <URL:http://msdn.microsoft.com/library/psdk/dasdk/odch8goj.htm.>.

Microsoft Corp., "Dynamic Cursors" [online], 2000, pp. 1. [Retrieved on Jun. 24, 2000]. Retrieved from the Internet at <URL: http://msdn.microsoft.com/library/psdk/sql/8_con_07_14.htm>.

Microsoft Corp., "Static Cursors" [online], 2000, pp. 1. [Retrieved on Jun. 24, 2000]. Retrieved from the Internet at <URL: http://msdn.microsoft.com/library/psdk/sql/8 con 07 12.htm>.

Microsoft Corp., "Cursor Types" [online], 2000, pp. 1. [Retrieved on Jun. 24, 2000]. Retrieved from the Internet at <URL: http://msdn.microsoft.com/library/psdk/sql/8_con_07_0.htm>.

Microsoft Corp., "What the Heck is a Cursor, Anyway?" [online], 2000, pp. 1–3. [Retrieved on Jun. 24, 2000]. Retrieved from the Internet at <URL: http://msdn.microsoft.com/library/partbook/vb6/whatheckiscursoranyway.htm.>.

Microsoft Corp., "Fetching and Scrolling" [online], 2000, pp. 1–2. [Retrieved on Jun. 24, 2000]. Retrieved on the Internet at <URL: http://msdn.microsoft.com/library/psdk/sql/8_con_07_7.htm>.

Microsoft Corp., "Changing Rows with Positioned Operations" [online], 2000, pp. 1–2. [Retrieved Jun. 24, 2000]. Retrieved from the Internet at <URL: http://msdn.microsoft.com/library/psdk/sql/8_con_07_22.htm>.

Microsoft Corp., "Cursors" [online], 2000, pp. 1. [Retrieved on Jun. 24, 2000]. Retrieved on the Internet at <URL: http://msdn.microsoft.com/library/psdk/sql/8_con_07.htm>.

Microsoft Corp., "Cursor Locking" [online], 2000, pp. 1. [Retrieved on Jun. 24, 2000]. Retrieved on the Internet at <URL: http://msdn.microsoft.com/library/psdk/sql/8_con_07_18.htm>.

Microsoft Corp., "Scrollable Cursors" [online], 2000, pp. 1. [Retrieved on Jun. 24, 2000]. Retrieved on the Internet at <URL: http://msdn.microsoft.com/library/devprods/vs6/vstudio/vsentpro/veconscrollablecursors.htm>.

Microsoft Corp., "Block Cursors, Scrollable Cursors, and Backward Compatibility for ODBC 3.x Applications" [online], 2000, pp. 1–3. [Retrieved on Jun. 24, 2000]. Retrieved from the Internet at <URL: http://msdn.microsoft.com/library/psdk/dasdk/odch8goj.htm>.

Microsoft Corp., "Using Block and Scrollable Cursors" [online], from ADABAS D ODBC Reference, no date listed, pp. 1–5. [Retrieved on Jun. 24, 2000]. Retrieved from the Internet at <URL: http://cs1.mcm.edu/tutorial/doc/Adabas/odbc/odbc41.htm>.

IBM Corporation. "Call Level Interface Guide and Reference" Version 7, IBM DB2 Universal Database, Reference #SC09–2950–00, 2000, pp. iii–864.

* cited by examiner

METHOD, SYSTEM, AND PROGRAM FOR ACCESSING ROWS IN ONE OR MORE TABLES SATISFYING A SEARCH CRITERIA

BACKGROUND OF THE INVENTION

1. Field of the Invention

The present invention relates to a method, system, and program for accessing rows in one or more tables satisfying a search criteria.

2. Description of the Related Art

Prior art database programs include a feature referred to as cursors. A cursor is a named control structure used by an application program to point to a row of interest within some set of rows and allow an application to retrieve, update or delete rows in the set. A cursor points to rows from a database table that satisfy a structured query language (SQL) query against the table. The rows in the table that satisfy the SQL query comprise a result set of data. The SQL query may include an SQL SELECT statement and a WHERE clause to qualify rows according to one or more predicates. An application can then access data on a row-by-row basis from the result set. The cursor SELECT statement may specify a simple SQL query on a single table or an SQL join operation performed on multiple tables.

A cursor is invoked with a DECLARE cursor command. Upon receiving the declare cursor statement, the SQL engine scans the entire base table and inserts a copy of all base table rows satisfying the query results in a result set. Only after all the qualifying rows are materialized in the result set can requests to fetch data from the result set be processed. Following materialization of the result set, the application program may then issue fetch commands to move the current row position and fetch forward or backward by one or more rows. The requested row in the FETCH is returned directly from the materialized result table. The application may also update or delete rows in the result set, which updates or deletes are then applied to the base table The above scrollable cursor and cursor database functions are often used on large desktop or database server systems that can generate a result set rather quickly. Moreover, any delays in materializing the result table often do not affect the performance of the desktop or server application program requesting the result set.

Although materialization time is not an important performance criteria for desktop and server database programs, the time to materialize a result set is a substantially important factor for small computer devices, such as hand held computers, e.g., palm top devices, personal digital assistance (PDA), telephony devices, etc. A user of a hand held computer may request a set of records from a database within the hand held computer that satisfy a search criteria, such as an address book or other personal records. Using prior art scrollable cursor techniques, the hand held computer would have to wait until the entire query against the base table was evaluated and the result set materialized before allowing the application program to access and present the data. For palm devices with limited computing capabilities and impatient users, such delays in making the requested data available to the application may be unacceptable to the user.

Accordingly, there is a need in the art for improved techniques for database searching to make queried records available to an application program.

SUMMARY OF THE PREFERRED EMBODIMENTS

Provided is a method, system, and program for accessing rows of data from a base table satisfying a search criteria. An initial request to access rows in the base table is received, including the search criteria specifying predicates for one or more columns in the base table. A data structure is generated to include information on qualifying base table rows that satisfy the search criteria. Notification is provided that the qualifying base table rows are accessible before information on all the qualifying base table rows is included in the data structure. A request is then received for one qualifying base table row. A determination is made as to whether the data structure includes information on the requested qualifying base table row. If so, the information in the data structure is used to provide access to the requested qualifying base table row.

Still further, the base table is scanned to locate a next qualifying base table row after determining that the data structure does not include information on the requested qualifying base table row. The next qualifying base table row is located and information on the located qualifying base table row is added to the data structure.

Additionally, the information on the requested qualifying base table row maintained in the data structure may comprise a unique row identifier of the row in the base table. The row identifier in the data structure is used to access the qualifying base table row identified by the row identifier.

In certain embodiments, the initial request to access data in the base table comprises a request to initialize a database cursor.

The described implementations provide a technique for allowing application programs faster access to a result set of qualifying base table rows satisfying a search criteria before all qualifying base table rows have been located.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
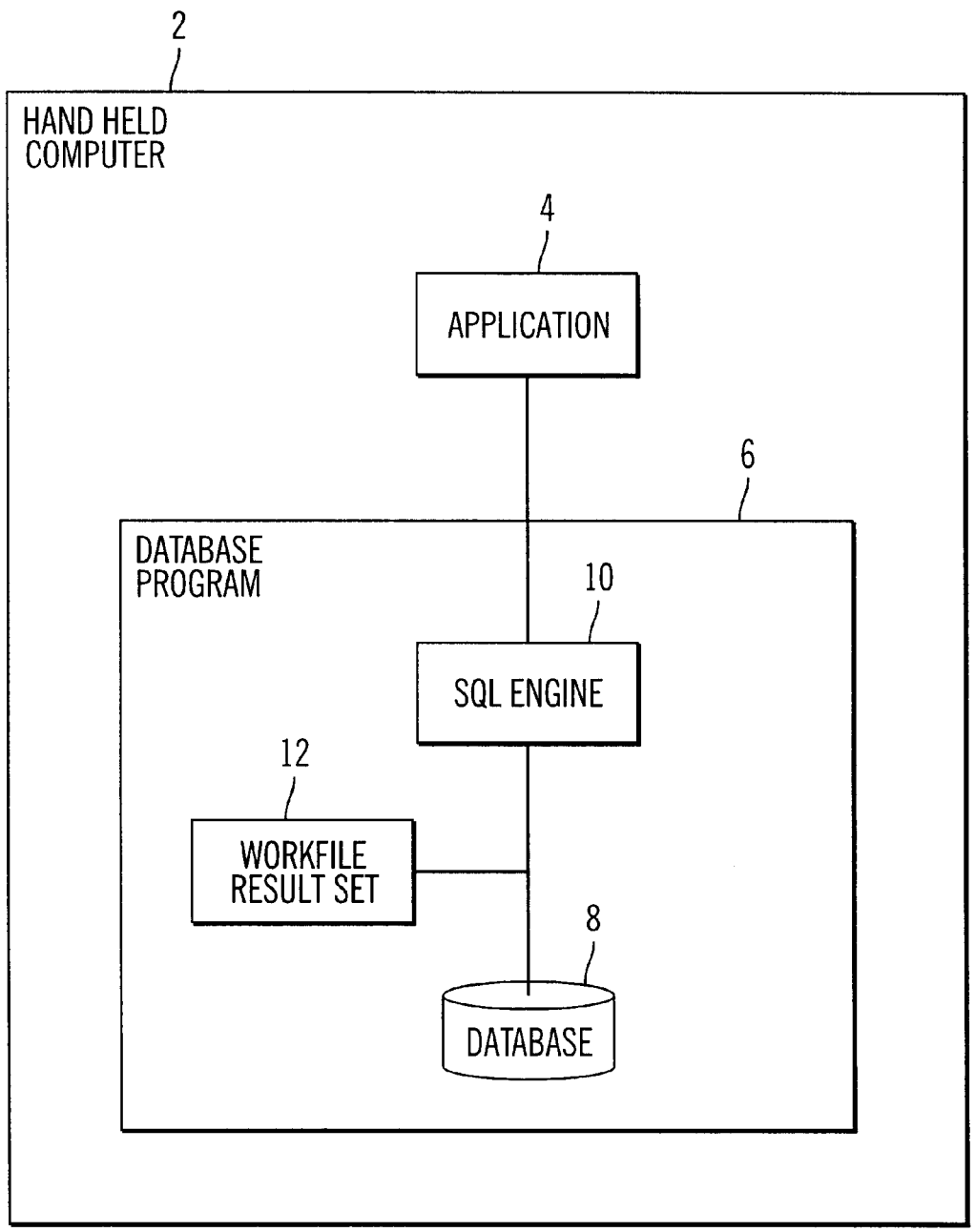
FIG. 1 illustrates a computing environment in which preferred embodiments are implemented.

FIG. 1 illustrates a computing environment in which preferred embodiments are implemented. A hand held computer 2, such as a personal digital assistance, telephony device, smart phone or any other type of portable computing device known in the art, includes an application program 4, a database program 6, and a database 8 including one or more database tables. The application program 4 would provide SQL requests for data to an SQL engine 10 component in the database program 6 that executes the query and returns requested data to the application program 4. When requesting data, the SQL engine 10 maintains a result table workfile 12 discussed below for providing access to data in the database 8 satisfying search criteria. All the program and data components 4, 6, 8, 10, and 12 may be implemented and executed in the memory and/or storage portion of the hand held computer 2. The hand held computer 2 may include a specialized operating system, such as PalmOS, Windows CE, EPOC, QNX Neutrino, embedded Linux or any other PDA type operating system known in the art.** The database program 6 may comprise a database program especially tailored to operate on hand held computing devices, such as the International Business Machines Corporation (IBM) DB2 Everyplace, or any other small footprint type relational or other database known in the art. The DB2 Everyplace database program is described in the publication "IBM DB2 Everyplace: Installation and User's Guide, Version 7", IBM document no. SC27-0764-00 (September 2000), which publication is incorporated herein by reference in its entirety.

The application program 4 may comprise any application program that accesses or updates data from the database 8. For instance, in an organization, employees may use the hand held computer 2 to gather or access data and then transfer any gathered data to a organizational source server using a synchronization program. The data synchronization step is the mechanism by which data from databases are downloaded to a mobile device, and mobile user updates are uploaded.

Figure 2:
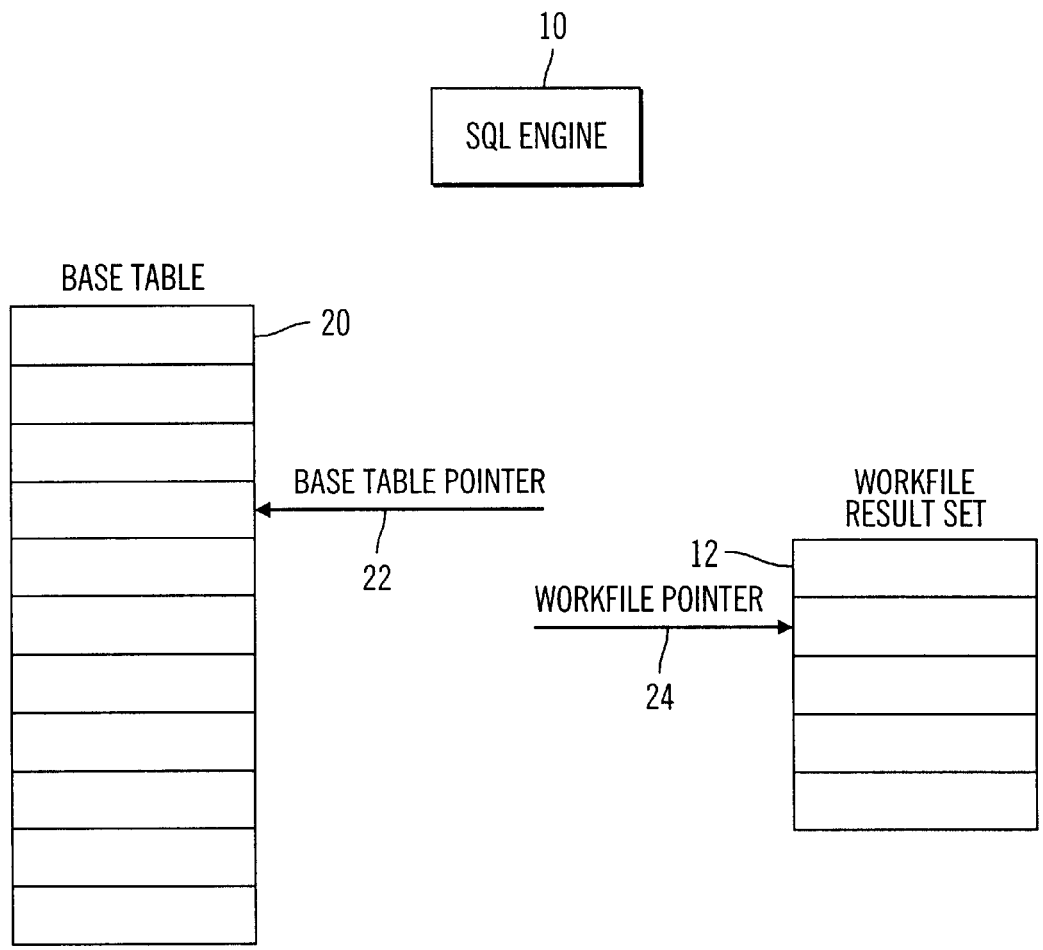
FIG. 2 illustrates data structures used in implementations of the present invention.

FIG. 2 illustrates data structures the SQL engine 10 utilizes to return data to the application program 4 in response to a SQL FETCH query on a base table 20 in the database 8. When initializing a cursor through a DECLARE and OPEN cursor statements, the application program 4 would expect the materialization of a result set including all base table rows that satisfy the query requirements before issuing FETCH commands to retrieve data from the result set. In the described implementations, the SQL engine 10 informs the application 4 that the result set is complete before evaluating all base table rows and populating an entire result set with qualifying base table rows. Instead, the SQL engine 10 generates a workfile result set 12 that is intended to only include the row IDs of base table 20 rows satisfying the cursor WHERE statement. Upon generating the empty workfile result set 12, the SQL engine 10 returns control to the application 4 to issue fetch requests even though the SQL engine 10 has not accessed all rows in the base table.

In the described implementations, the SQL engine 10 maintains two cursors to manage a FETCH request, a base table pointer 22 and a workfile pointer 24. Each row in the base table 22 is identified according to a unique row identifier (ID) that is typically located in the first column of each row. The result table workfile 12 includes the row ID of those rows in the base table 22 that satisfied the query specified by the application program 4. The SQL engine 10 uses the result table workfile 12 to determine how to respond to FETCH requests from the application program 4 in order to minimize the time to respond to fetch requests from the application program 4.

The application program 4 begins a scrollable cursor operation with a DECLARE cursor statement that provides a cursor name and an SQL SELECT specifying columns to return and a WHERE clause including one or more predicates to qualify rows of the database table 60. In response to FETCH requests on the cursor, the SQL engine 10 would return the selected columns in the SELECT list from rows that satisfy the WHERE statement. The following are the notations used by the rules of the FETCH operations:

Before Start: The workfile pointer 22 is positioned before the start of the result table workfile.

After end: the workfile pointer 22 is positioned after the end of the workfile result table 12. The "after end" row in the workfile result table 12 is only known after the entire base table 20 has been evaluated against the WHERE statement. If the entire base table has not been evaluated, then the after end of the result table is not known.

Last Result Row: the number of the last row in the result table. Again, this value is only known if the entire base table 20 has been evaluated, otherwise the value is not available.

Fetch Offset: the value of the fetch offset to fetch forward or backward form the current workfile pointer position (FETCH RELATIVE) or from the start or end of the result table (FETCH ABSOLUTE).

Below are the FETCH commands the application program 4 can issue after the result set workfile 12 is initiated.

SQL_FETCH_NEXT: Return the next row in the result table.

SQL_FETCH_PRIOR: Return the prior row in the result table.

SQL_FETCH_ABSOLUTE: A fetch offset of k is provided, and the cursor is moved to the kth row in the result table if the fetch offset is positive or 0 or to k rows from the bottom of the table if the fetch offset is negative. The row at the adjusted cursor position is returned.

SQL_FETCH_RELATIVE: The fetch offset of k is provided. This statement moves the cursor position to the rowset in the result table k rows after the current row if the fetch offset is positive to k rows before the current row if the fetch offset is negative. The row at the new cursor position is returned.

SQL_FETCH_FIRST: returns the first row in the result set.

SQL_FETCH_LAST: Return the last complete row in the result set.

Figure 3:
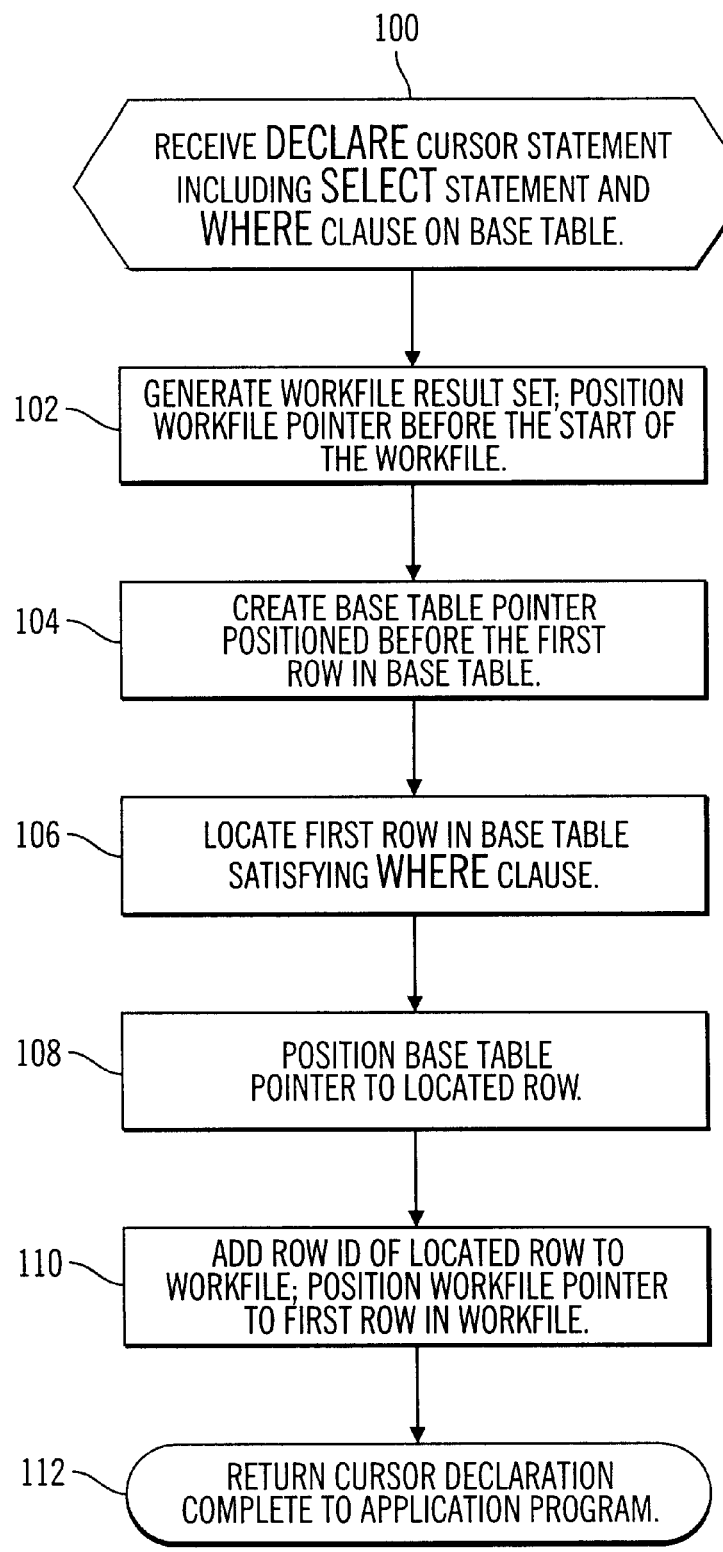
FIG. 3 illustrates logic implemented in an SQL engine to initialize a cursor in response to a DECLARE CURSOR statement in accordance with implementations of the present invention.

FIG. 3 illustrates logic implemented in the SQL engine 10 to process a DECLARE cursor request from the application program 4 and return a notification that the DECLARE request is completed and a result set has been materialized. Control begins at block 100 with the SQL engine 10 receiving a DECLARE cursor statement from the application 4. In response, the SQL engine 10 generates (at block 102) a workfile result set 12, also referred to as workfile 12, and positions the workfile pointer 24 before the start of the workfile 12. The SQL engine 10 further creates (at block 104) a base table pointer 22 positioned before the first row in the base table 20. The first row in the base table that satisfies the WHERE predicates of the cursor is located (at block 106). If there were no rows in the base table 22 satisfying the cursor predicates, then a message of such an event would be returned to the application 4 to display information, such as "no data" on the hand held 2 display. The base table pointer 22 is positioned to the first located row in the base table 20 satisfying the cursor declaration. The row ID of the located base table 20 row is added (at block 110) to the workfile 12 and the workfile pointer 24 is moved to the first row in the workfile 12. The SQL engine 10 then returns (at block 112) a complete message to the application 4, which leads the application 4 to conclude that there is a result set materialized in memory notwithstanding that only the first qualifying row is in the workfile 12, not the entire result set exists.

Figure 4:
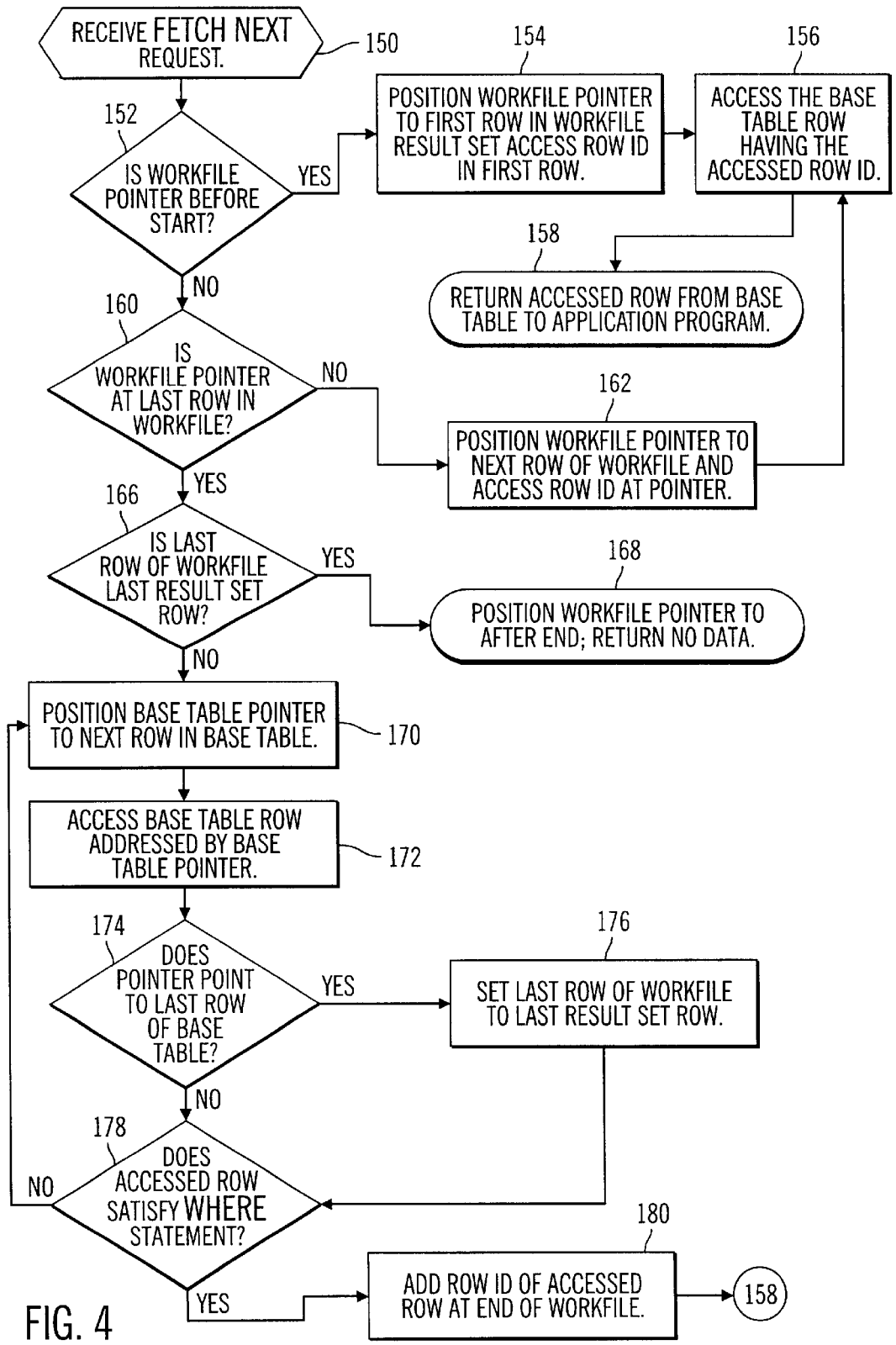
FIG. 4 illustrates logic implemented in the SQL engine to process a FETCH NEXT request in accordance with implementations of the present invention.

FIG. 4 illustrates logic implemented in the SQL engine 10 to process a FETCH NEXT request from the application 4. In response to receiving (at block 150) the FETCH NEXT request, if (at block 152) the workfile pointer 24 is before the start of the workfile 12, then the SQL engine 10 moves (at block 154) the workfile pointer 24 to the first row in the workfile 12 and accesses the row ID in the first row. The SQL engine 10 then accesses (at block 156) the base table 20 row at the accessed row ID and returns (at block 158) the SELECT columns specified in the cursor from the accessed row to the application 4. If (at block 152) the workfile pointer 22 is not before the start of the workfile 12 and if (at block 160) the workfile pointer 22 is not at the last row in the workfile 12, then the workfile pointer 22 is positioned (at block 162) to the next row of the workfile 12 and the row ID at the cursor 22 is accessed. Control then proceeds to block 156 to access and return the base table row at the accessed row ID.

If (at block 160) the workfile pointer 22 is at the last row in the workfile 12 and if (at block 166) the last row of the workfile 12 is the last result set row, then the SQL engine 10 positions (at block 168) the workfile pointer 22 to after the end of the workfile 12 and does not return data. The last result row set would be determined after evaluating the entire base table 20 for qualifying rows. If (at block 166) the last row of the workfile is not the last result set row, then the SQL engine 10 positions (at block 170) the base table pointer 22 to the next row in the base table 20 and accesses (at block 172) the base table row addressed by the base table pointer 22. If (at block 174) the cursor 22 points to the last row of the base table 20, then the SQL engine 10 sets (at block 176) the last row of the workfile as the last result set row. From block 176 or if the last row of the base table 20 is not reached (at block 174), the SQL engine 10 determines (at block 178) whether the accessed row satisfies the WHERE statement. If not, then control proceeds back to block 170; otherwise, if so, control proceeds to block 180 to add the row ID of the accessed row to the end of the workfile 12. From block 180, control proceeds back to block 158 to return the row from the base table having the row ID at the end of the workfile 12.

Figure 5:
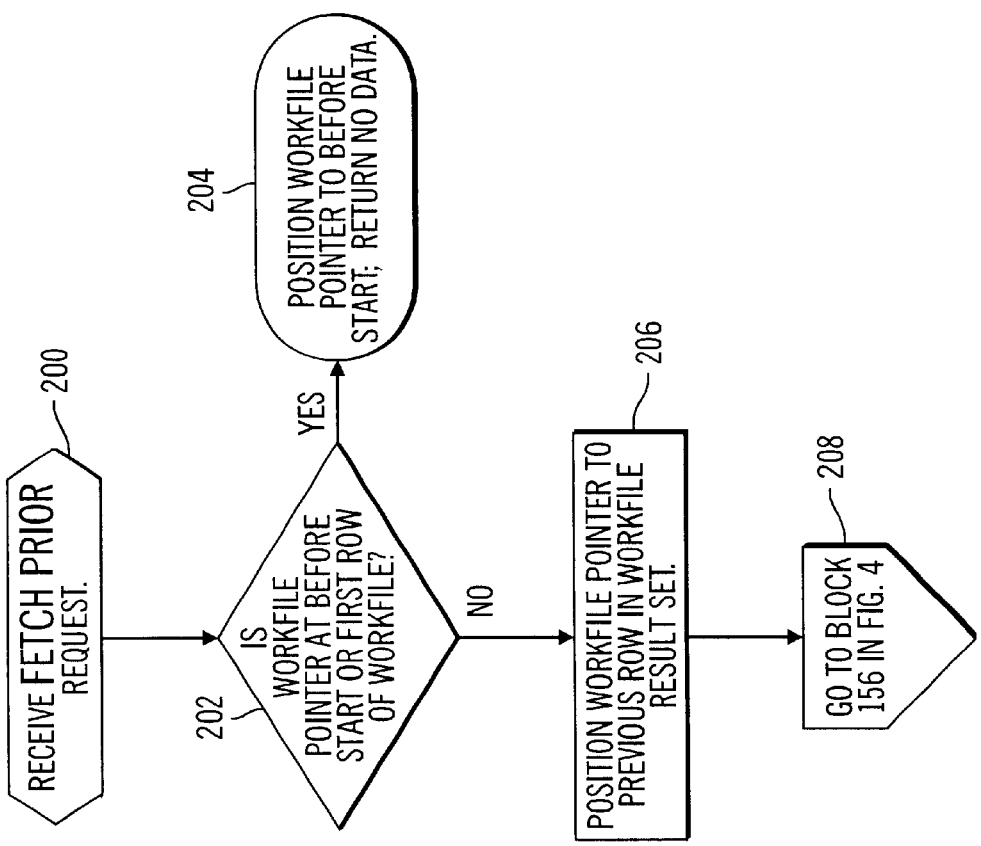
FIG. 5 illustrates logic implemented in the SQL engine to process a FETCH PRIOR request in accordance with implementations of the present invention.

FIG. 5 illustrates logic implemented in the SQL engine to handle a FETCH PRIOR request from the application 4. In response to receiving (at block 200) the FETCH PRIOR request, if (at block 202) the workfile pointer 24 is before the start or at the first row of the workfile 12, then the workfile pointer 24 is positioned (at block 204) to before the start of the workfile 12, if the cursor 24 is not already there, and no data is returned. Otherwise, if the workfile pointer 24 follows the first row of the workfile 12, then the SQL engine 10 moves (at block 206) the workfile pointer 24 to the previous row in the workfile result set 12 and proceeds to block 156 in FIG. 4 to access the base table 20 row having the row ID at the current cursor 24 position in the workfile 12, and returns the SELECT columns of the accessed row.

Figure 6:
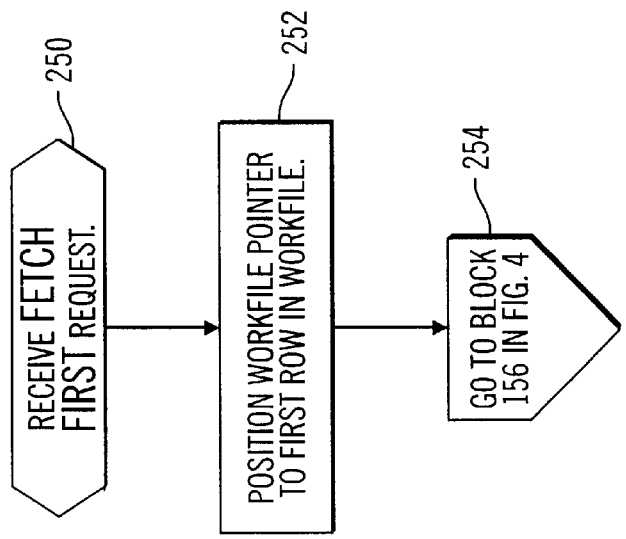
FIG. 6 illustrates logic implemented in the SQL engine to process a FETCH FIRST request in accordance with implementations of the present invention.

FIG. 6 illustrates logic implemented in the SQL engine 10 to handle a FETCH FIRST request from the application 4. In response to receiving (at block 250) the FETCH FIRST request, the SQL engine 10 positions (at block 252) the workfile pointer 24 to the first row in the workfile 12 and proceeds to block 156 in FIG. 4 to access the base table 20 row having the row ID at the current cursor 24 position in the workfile 12, and return the SELECT columns of the accessed row.

Figure 7:
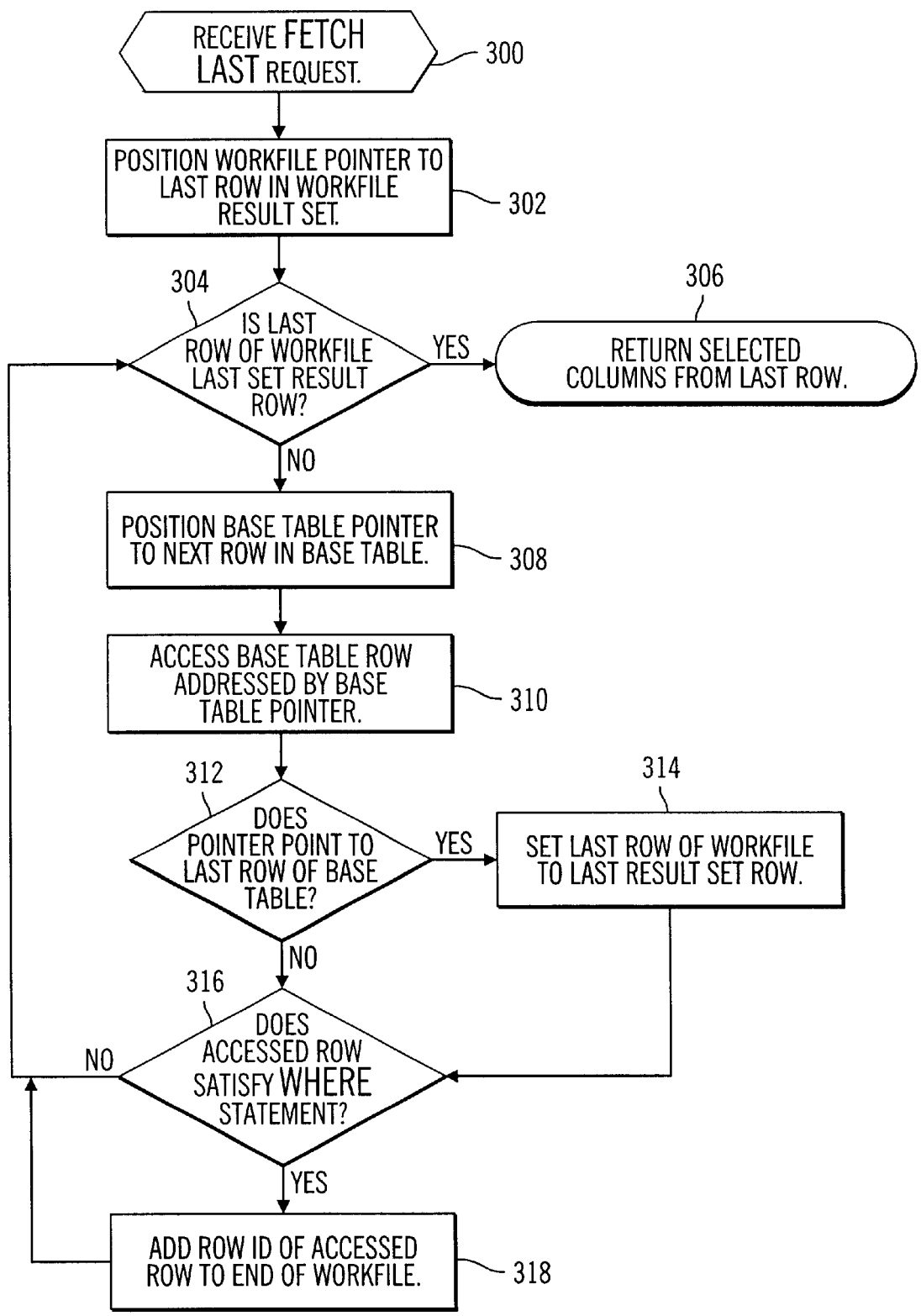
FIG. 7 illustrates logic implemented in the SQL engine to process a FETCH LAST request in accordance with implementations of the present invention.

FIG. 7 illustrates logic implemented in the SQL engine 10 to handle a FETCH LAST request. In response to receiving (at block 300) the FETCH LAST request, the SQL engine 10 positions (at block 302) the workfile cursor 24 to the last row in the workfile 12. If (at block 304) the last row of the workfile 12 is the last result set row, which occurs after the entire base table 20 has been evaluated, then the SQL engine 10 returns (at block 306) the selected columns from the last row of the workfile 12. If (at block 304) the last row of the workfile 12 is not the last result set row, then the SQL engine 10 positions (at block 308) the base table cursor 22 to the next row in the base table and accesses (at block 310) the row addressed by the base table pointer 22. If the pointer 22 points to the last row of the base table 20, then the last row of the workfile 12 is set (at block 314) to the last result set row, i.e., the last qualifying base table row of the result set. From the no branch of block 312 or 314, if (at block 316) the accessed row satisfies the WHERE statement, then the row ID of the accessed row is added to the end of the workfile 12. At block 318, the row ID of the accessed base table 20 row is added to the end of the workfile 12. From block 318 or the no branch of block 316, control proceeds back to block 304 to continue scrolling through the base table 10 to materialize the entire result set in the workfile 12 because the application 4 has requested to FETCH the last entry in the result set.

Figure 8:
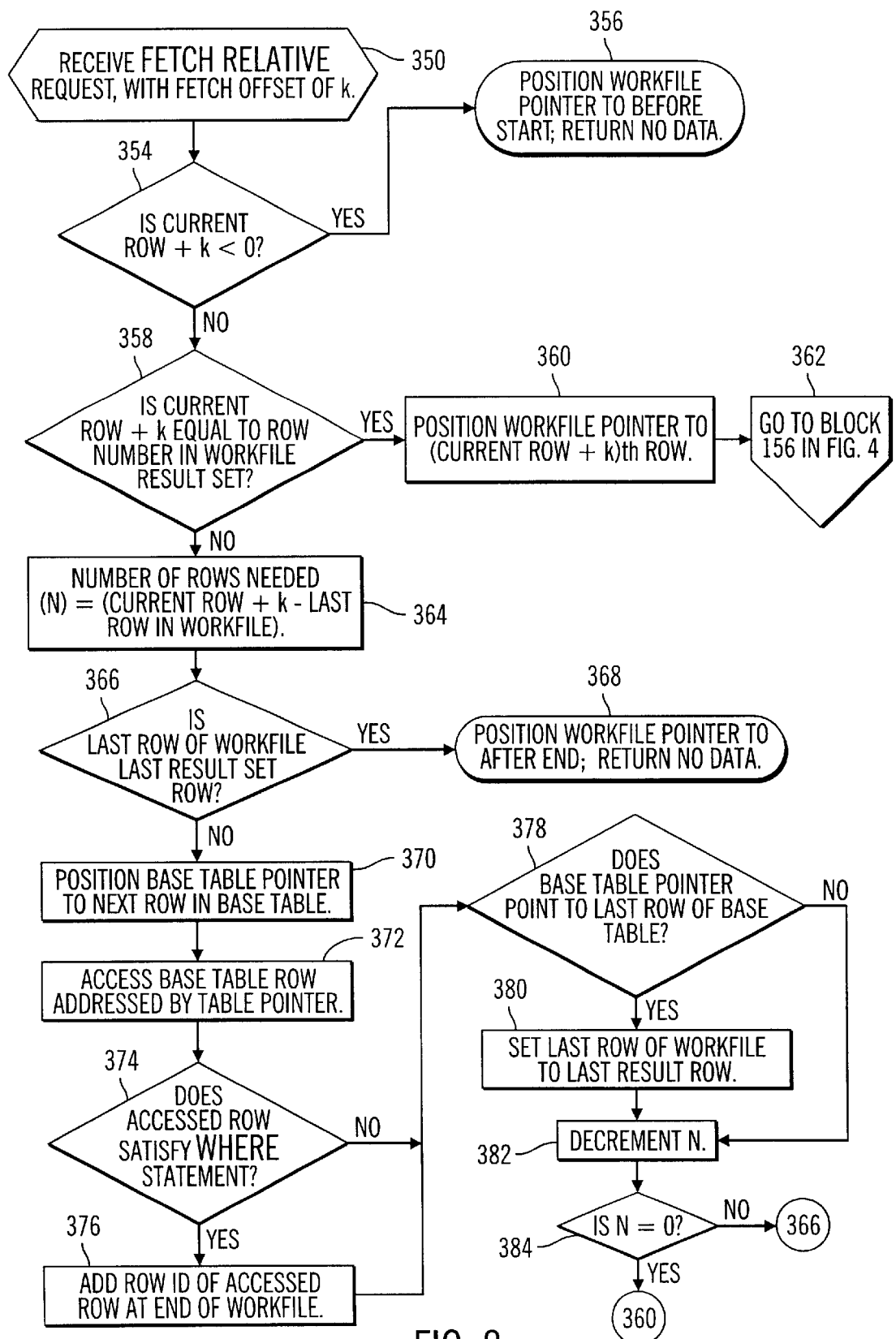
FIG. 8 illustrates logic implemented in the SQL engine to process a FETCH RELATIVE request in accordance with implementations of the present invention.

FIG. 8 illustrates logic implemented in the SQL engine 10 to handle a FETCH RELATIVE request from the application 4 to fetch forward or backward the fetch offset, referred to as k in FIG. 7. In response to receiving (at block 350) the FETCH RELATIVE request (at block 350), if (at block 354) the current result row in the workfile 12, i.e., the row addressed by the workfile pointer 24, plus k, the fetch offset, is less than zero, then the FETCH relative is to fetch backward beyond the start end of the workfile 12 from the current result row. In such case, the SQL engine 10 positions (at block 356) the workfile pointer 24 before the start of the workfile 12 and returns no data. If (at block 354) the current row plus k is not less than zero and if (at block 358) the current row plus k is equal to a existing row number in the workfile result set 12, i.e., the row ID for the requested row is in the workfile 12, then the SQL engine 10 positions (at block 360) the workfile pointer 24 to the current row plus kth row and proceeds (at block 362) to block 156 in FIG. 4 to return the corresponding row from the base table 20 using the row ID.

If (at block 358) the current row plus k is not equal to an existing row number in the workfile result set 12, i.e., the row ID for the requested row is not in the workfile 12, then the SQL engine 10 determines (at block 364) the number of additional rows (N) needed in the workfile 12 to reach the kth row from the result row addressed by the workfile pointer 24, which equals the current row plus k minus the last row in the workfile 12. If (at block 366) the last row of the workfile 12 is the last result set row, i.e., the entire base table 20 was scanned for qualifying result set rows, then the SQL engine 10 positions (at block 368) the workfile pointer 24 to after the end of the workfile 12 and returns no data. Otherwise, if the last workfile 12 row is not the last result row, then the base table pointer 22 is moved (at block 370) to the next row and the next row is accessed (at block 372). If (at block 374) the accessed row satisfies the query condition, then the row ID of the accessed row form the base table 20 is added (at block 376) to the end of the workfile 12. From block 376 or the no branch of block 374, a determination is made (at block 378) as to whether the base table pointer 22 points to the last row of the base table 20. If so, then the last row of the workfile 12 is set (at block 380) as the last result set row. From block 380 or the no branch of block 378, N is decremented (at block 382). If (at block 384) N is zero, then control proceeds to block 360 to complete the FETCH RELATIVE request because the workfile 12 has been appended with enough new qualifying rows to satisfy the request. Otherwise, if N has not been decremented to be zero, then control proceeds to block 366 to scan the base table 20 further for more qualifying rows.

Figure 9:
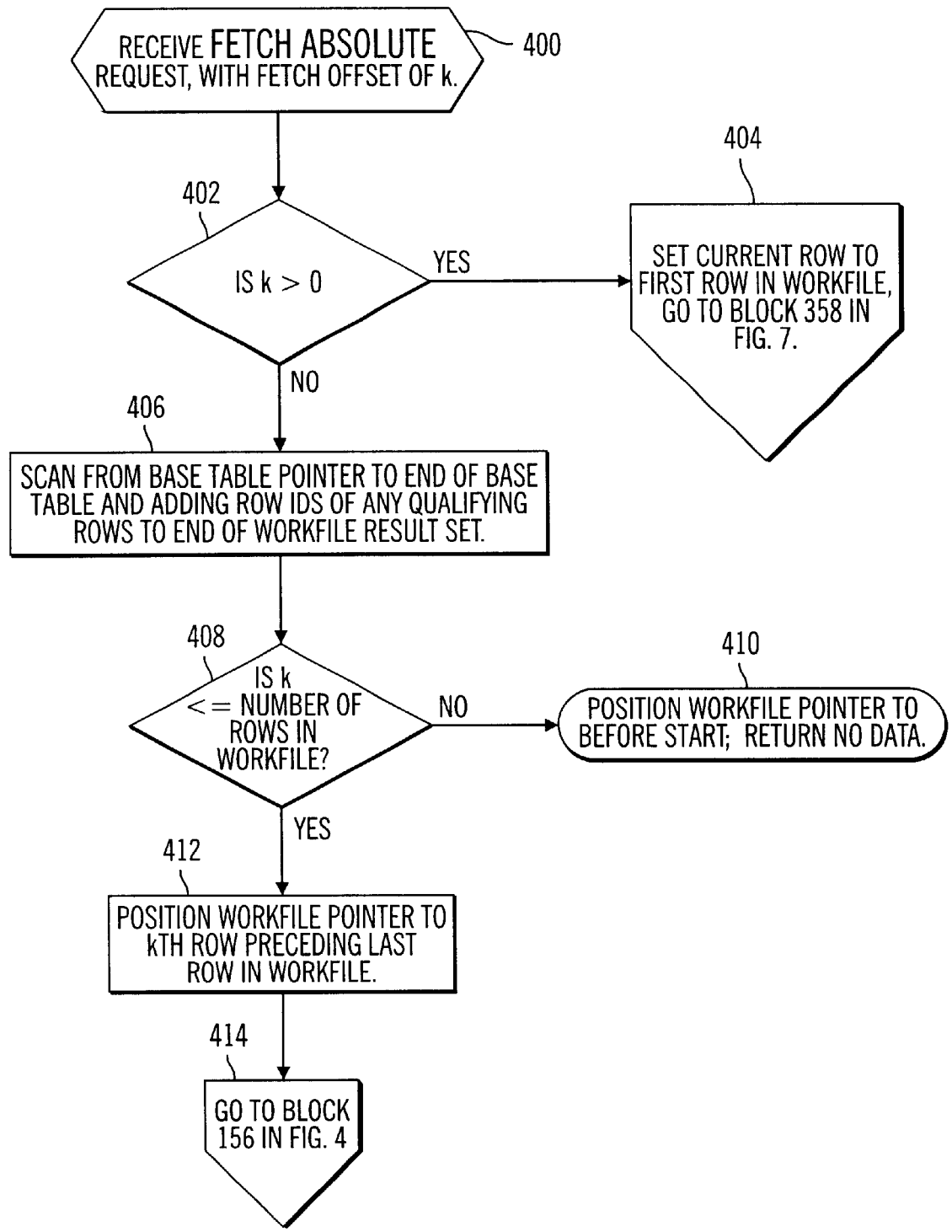
FIG. 9 illustrates logic implemented in the SQL engine to process a FETCH ABSOLUTE request in accordance with implementations of the present invention.

FIG. 9 illustrates logic implemented in the SQL engine 10 to process a FETCH ABSOLUTE with a fetch offset of k. In response to receiving (at block 400) the FETCH ABSOLUTE request, if (at block 402) k is greater than zero, then control proceeds to block 358 in FIG. 7, with the current row used at block 358 et seq. set to the first row in the workfile 12. If k is less than zero, then the SQL engine 10 scans (at block 406) the base table 20 from the base table pointer 22 to the end of the base table 20 and adds the row IDs of any qualifying rows to the end of the workfile 12. Note that if k is zero, then the fetch is not a FETCH ABSOLUTE. After scanning the base table 20 for the remaining qualifying rows, the SQL engine 10 determines (at block 408) if k is greater than the number of rows in the workfile 12, which includes the row IDs of all the rows in the result set, than the workfile pointer 24 is positioned (at block 410) before the start of the workfile 12 and no data is returned. Otherwise, the workfile pointer 24 is positioned (at block 412) to the k row preceding the last row in the workfile 12 and control proceeds (at block 414) to block 156 in FIG. 4 to return the data in the base table 20 at the row ID inj the workfile 12 row addressed by the workfile pointer 24.

The search criteria specified in the DECLARE CURSOR statement may specify multiple rows in a join operation. In such case, rows from multiple base tables would be evaluated when executing the search criteria. When multiple tables are involved in the search, the workfile 12 would include the row ID of each row from the multiple base tables involved in the search that satisfied the search criteria. If the workfile 12 includes a pair of row IDs for a join operation, then both of the rows from the tables involved in the join operation would be sent to the requesting application 4.

With the above logic of FIGS. 4–9, the number of rows that are evaluated in the base table 20 is minimized until the time such evaluations are necessary to provide further result set rows needed to respond to FETCH requests. In fact, the SQL engine 10 allows the application 4 to start fetching data before all the rows are materialized in the result set. Instead, the application 4 may start fetching rows after only one base table 20 row is qualified as satisfying the cursor WHERE statement. This minimizes the delay time in returning control to the application 4 requesting a scrollable cursor because the application 4 does not have to wait until the base table 20 is evaluated and the entire result set is materialized. Such delays in materializing the result set can be significant for devices with limited computational capabilities, such as hand held computers. Moreover, such delays have an effect on the desirability of the product because the hand held computer user may be annoyed at excessive delays in using their application programs 4 to retrieve and review information.

The described implementations also conserve the memory resources of the hand held computer 2, which are often limited, by maintaining only the row ID of qualifying base table rows in the workfile, as opposed to materializing the actual rows of data in the result set as done in the art.

Following are some alternative implementations of the present invention.

The preferred embodiments may be implemented as a method, apparatus or program using standard programming and/or engineering techniques to produce software, firmware, hardware, or any combination thereof The programs and code defining the functions of the preferred embodiment can be delivered to a computer via a variety of information bearing media, which include, but are not limited to, computer-readable devices, firmware, programmable logic, memory devices (e.g., EEPROMs, ROMs, PROMs, RAMs, SRAMs, etc.) "floppy disk," CD-ROM, a file server providing access to the programs via a network transmission line, wireless transmission media, signals propagating through space, radio waves, infrared signals, etc. Still further the code in which the preferred embodiments are implemented may comprise hardware or electronic devices including logic to process data, such as application specific integrated circuits (ASICs), field programmable gate arrays (FPGAs), etc. Of course, those skilled in the art will recognize that many modifications may be made to this configuration without departing from the scope of the present invention.

The preferred logic of FIGS. 3–9 described specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

FIG. 2 described particular data structures used to generate a partial view of the result set that is built on an "as needed" basis. Additionally, different database program structures may be utilized to perform operations described herein as performed by a certain component. In other words, the preferred embodiment cursors and workfile result set may be implemented in different database program architectures.

The workfile result set was described as maintaining a row ID of a corresponding row in the base table satisfying the cursor WHERE statement query. Additionally, the workfile result set 12 may maintain additional information, such as the actual row of data from the base table 12. With such implementations, the SQL engine 10 can service FETCH requests directly from the workfile 12 without having to retrieve the row having the row ID from the base table 20.

In the described implementations, in response to the DECLARE CURSOR statement, the SQL engine 10 would generate the workfile with a row ID of the first qualifying row in the base table 20 before returning indication to the application 4 that the cursor is open. Alternatively, the SQL engine 10 may add the row ID of more than one row or evaluate no base table 20 rows before notifying the application 4 that the requested cursor is opened.

The described implementation of the result set as a workfile may be used for any type of cursor, including non-scrollable cursors, scrollable cursors, static cursors, dynamic cursors, etc.

In the described implementations, each FETCH request was for a single row of data from the result set. Alternatively, a rowset comprising multiple rows may be returned in response to each FETCH request. In such rowset implementations, the logic of FIGS. 3–9 would have to be adjusted to account for the fact that multiple qualifying base table rows are returned in response to each FETCH request.

The workfile was described as having particular configuration columns and control blocks. Alternatively, the result set may have a format different than that described herein.

The described implementations were embedded in a relational database program. Additionally, the above implementations may be implemented in non-relational database programs, such as object oriented database programs.

The above described implementations were utilized in a portable, hand held computing device. Additionally, the above described cursor implementation may be implemented in desktop or server based systems.

The above described implementations were described with respect to providing access to data as part of a scrollable cursor. However, the above described implementations may be used to provide access to data in a base table when there is no cursor or scrollable cursor involved.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for accessing rows of data from a base table satisfying a search criteria, comprising:
    receiving an initial request to access rows in the base table including the search criteria specifying predicates for one or more columns in the base table;
    generating a data structure to include information on qualifying base table rows that satisfy the search criteria in response to the initial request;
    providing notification that the qualifying base table rows are accessible before information on all the qualifying base table rows is included in the data structure;
    receiving a second request for one qualifying base table row after the notification is provided;
    determining whether the data structure includes information on the requested qualifying base table row in the base table; and
    using the information in the data structure to access the requested qualifying base table row from the base table, wherein the requested qualifying row is returned from the base table to the second request.

2. The method of claim 1, further comprising:
    scanning the base table to locate a next qualifying base table row after determining that the data structure does not include information on the requested qualifying base table row;
    locating the next qualifying base table row; and
    adding information on the located qualifying base table row to the data structure.

3. The method of claim 1, wherein the information on the requested qualifying base table row maintained in the data structure comprises a unique row identifier of the row in the base table, wherein the row identifier in the data structure is used to access the qualifying base table row identified by the row identifier.

4. The method of claim 2, wherein the data structure maintains one row for each base table row for which information is maintained, further comprising:
    positioning a first pointer to point to a position in the data structure including information on the last requested qualifying base table row; and
    positioning a second pointer to address a most recently located qualifying base table row in the base table for which information was added to the data structure, wherein the data structure includes information on all the qualifying base table rows after a last row in the base table is evaluated with the search criteria.

5. The method of claim 4, wherein the initial request to access data in the base table comprises a request to initialize a database cursor.

6. The method of claim 5, wherein the second request for the qualifying base table row comprises a FETCH request with an offset, wherein the requested qualifying base table row is at the offset from the last requested qualifying base table row, and wherein determining whether the data structure includes information on the requested qualifying base table row comprises determining whether the data structure includes one row at the offset from the row addressed by the first pointer.

7. The method of claim 6, wherein the FETCH request is capable of comprising one of a: FETCH NEXT request; FETCH PRIOR request; FETCH LAST request; FETCH FIRST request; FETCH RELATIVE request; or FETCH ABSOLUTE request.

8. The method of claim 6, wherein the FETCH request comprises a FETCH NEXT request to FETCH the next qualifying base table row following the base table row identified by the information in the data structure addressed by the first pointer.

9. The method of claim 6, wherein the FETCH request comprises a request for the qualifying base table row at the offset from the base table row identified by the information in the row in the data structure row addressed by the first pointer, wherein after determining that the data structure does not include information on the requested qualifying base table row and if the offset number of rows from the row in the data structure addressed by the pointer is more than one row beyond a last row in the data structure, further performing:
    locating multiple qualifying base table rows following the second pointer;
    adding information on the located multiple qualifying base table rows to corresponding added rows in the data structure; and
    positioning the first pointer to the last row in the data structure after row are added to the data structure to include information on the multiple located base table rows, wherein the last row in the data structure includes information on the requested qualifying base table row.

10. The method of claim 9, wherein if the offset specifies one qualifying base table row preceding the qualifying base table row for which information is maintained in the row in the data structure addressed by the first pointer, further performing:

positioning the first pointer to the row in the data structure at the offset from the row addressed by the first pointer.

11. The method of claim 6, wherein the FETCH request comprises a FETCH ABSOLUTE request to fetch one qualifying base table row at the offset from a first or last qualifying row in the base table, further comprising:
  scanning the entire base table to locate further qualifying base table rows if the FETCH ABSOLUTE request specifies one base table row at the offset from the last qualifying base table row;
  adding information on all located qualifying base table rows to rows in the data structure; and
  positioning the first pointer to one row in the data structure preceding a last row in the data structure by the specified offset.

12. The method of claim 11, wherein the offset specifies a row from the first qualifying base table row for which information is not provided in the data structure, further comprising:
  locating one or more qualifying base table rows following the second pointer;
  adding information on the located multiple qualifying base table rows to corresponding added rows in the data structure; and
  positioning the first pointer to the row in the data structure following the first row in the data structure by the specified offset.

13. The method of claim 1, wherein the method for accessing data is implemented in a hand held computing device.

14. The method of claim 1, wherein the notification indicates that a result set including all qualifying base table rows is complete.

15. The method of claim 1, wherein the notification is provided in response to adding information on a first qualifying base table row to the data structure.

16. A system for accessing rows of data from a base table satisfying a search criteria, comprising:
  means for receiving an initial request to access rows in the base table including the search criteria specifying predicates for one or more columns in the base table;
  means for generating a data structure to include information on qualifying base table rows that satisfy the search criteria from the base table;
  means for providing notification that the qualifying base table rows are accessible before information on all the qualifying base table rows is included in the data structure; and
  means for receiving a second request for one qualifying base table row after the notification is provided;
  means for determining whether the data structure includes information on the requested qualifying base table row in the base table; and
  means for using the information in the data structure to access the requested qualifying base table row from the base table, wherein the requested qualifying row is returned from the base table to the second request.

17. The system of claim 16, further comprising:
  means for scanning the base table to locate a next qualifying base table row after determining that the data structure does not include information on the requested qualifying base table row;
  means for locating the next qualifying base table row; and
  means for adding information on the located qualifying base table row to the data structure.

18. The system of claim 16, wherein the information on the requested qualifying base table row maintained in the data structure comprises a unique row identifier of the row in the base table, wherein the row identifier in the data structure is used to access the qualifying base table row identified by the row identifier.

19. The system of claim 17, wherein the data structure maintains one row for each base table row for which information is maintained, further comprising:
  means for positioning a first pointer to point to a position in the data structure including information on the last requested qualifying base table row; and
  means for positioning a second pointer to address a most recently located qualifying base table row in the base table for which information was added to the data structure, wherein the data structure includes information on all the qualifying base table rows after a last row in the base table is evaluated with the search criteria.

20. The system of claim 19, wherein the initial request to access data in the base table comprises a request to initialize a database cursor.

21. The system of claim 20, wherein the second request for the qualifying base table row comprises a FETCH request with an offset, wherein the requested qualifying base table row is at the offset from the last requested qualifying base table row, and wherein determining whether the data structure includes information on the requested qualifying base table row comprises determining whether the data structure includes one row at the offset from the row addressed by the first pointer.

22. The system of claim 21, wherein the FETCH request is capable of comprising one of a: FETCH NEXT request; FETCH PRIOR request; FETCH LAST request; FETCH FIRST request; FETCH RELATIVE request; or FETCH ABSOLUTE request.

23. The system of claim 21, wherein the FETCH request comprises a FETCH NEXT request to FETCH the next qualifying base table row following the base table row identified by the information in the data structure addressed by the first pointer.

24. The system of claim 21, wherein the FETCH request comprises a request for the qualifying base table row at the offset from the base table row identified by the information in the row in the data structure row addressed by the first pointer, further comprising:
  means for locating multiple qualifying base table rows following the second pointer after determining that the data structure does not include information on the requested qualifying base table row and if the offset number of rows from the row in the data structure addressed by the pointer is more than one row beyond a last row in the data structure;
  means for adding information on the located multiple qualifying base table rows to corresponding added rows in the data structure; and
  means for positioning on the first pointer to the last row in the data structure after rows are added to the data structure to include information on the multiple located base table rows, wherein the last row in the data structure includes information on the requested qualifying base table row.

25. The system of claim 24, further comprising:
  means for positioning the first pointer to the row in the data structure at the offset from the row addressed by the first pointer if the offset specifies one qualifying base table row preceding the qualifying base table row for which information is maintained in the row data structure addressed by the first pointer.

26. The system of claim 21, wherein the FETCH request comprises a FETCH ABSOLUTE request to fetch one qualifying base table row at the offset from a first or last qualifying row in the base table, further comprising:

means for scanning the entire base table to locate further qualifying base table rows if the FETCH ABSOLUTE request specifies one base table row at the offset from the last qualifying base table row;

means for adding information on all located qualifying base table rows to rows in the data structure; and means for positioning the first pointer to one row in the data structure preceding a last row in the data structure by the specified offset.

27. The system of claim 26, wherein the offset specifies a row from the first row qualifying base table row for which information is not provided in the data structure, further comprising:

means for locating one or more qualifying base table rows following the second pointer;

means for adding information on the located multiple qualifying base table rows to corresponding added rows in the data structure; and means for positioning the first pointer to the row in the data structure following the first row in the data structure by the specified offset.

28. The system of claim 16, wherein the method for accessing data is implemented in a hand held computing device.

29. The system of claim 16, wherein the notification indicates that a result set including all qualifying base table rows is complete.

30. The system of claim 16, wherein the notification is provided in response to adding information on a first qualifying base table row the data structure.

31. A program for accessing rows of data from a base table satisfying a search criteria, wherein the program is comprised of code implemented in a computer readable medium that is capable of causing a processor to perform:

receiving an initial request to access rows in the base table including the search criteria specifying predicates for one or more columns in the base table;

generating a data structure to include information on qualifying base table rows that satisfy the search criteria in response to the initial request;

providing notification that the qualifying base table rows are accessible before information on all the qualifying base table rows is included in the data structure; and receiving a second request for one qualifying base table row after the notification is provided;

determining whether the data structure includes information on the requested qualifying base table row in the base table; and using the information in the data structure to access the requested qualifying base table row from the base table, wherein the requested qualifying row is returned from the base table to the second request.

32. The program of claim 31, wherein the program code is further capable of causing the processor to perform:

scanning the base table to locate a next qualifying base table row after determining that the data structure does not include information on the requested qualifying base table row;

locating the next qualifying base table row; and adding information on the located qualifying base table row to the data structure.

33. The program of claim 31, wherein the information on the requested qualifying base table row maintained in the data structure comprises a unique row identifier of the row in the base table, wherein the row identifier in the data structure is used to access the qualifying base table row identified by the row identifier.

34. The program of claim 33, wherein the data structure maintains one row for each base table row for which information is maintained, and wherein the program code is further capable of causing the processor to perform:

positioning a first pointer to point to a position in the data structure including information on the last requested qualifying base table row; and positioning a second pointer to address a most recently located qualifying base table row in the base table for which information was added to the data structure, wherein the data structure includes information on all the qualifying base table rows after a last row in the base table is evaluated with the search criteria.

35. The program of claim 34, wherein the initial request to access data in the base table comprises a request to initialize a database tumor.

36. The program of claim 35, wherein the second request for the qualifying base table row comprises a FETCH request with an offset, wherein the requested qualifying base table row is at the offset from the last requested qualifying base table row, and wherein determining whether the data structure includes information on the requested qualifying base table row comprises determining whether the data structure includes one row at the offset from the row addressed by the first pointer.

37. The program of claim 36, wherein the FETCH request is capable of comprising one of a: FETCH NEXT request; FETCH PRIOR request; FETCH LAST request; FETCH FIRST request; FETCH RELATIVE request; or FETCH ABSOLUTE request.

38. The program of claim 36, wherein the FETCH request comprises a FETCH NEXT request to FETCH the next qualifying base table row following the base table row identified by the information in the data structure addressed by the first pointer.

39. The program of claim 36, wherein the FETCH request comprises a request for the qualifying base table row at the offset from the base table row identified by the information in the row in the data structure row addressed by the first pointer, wherein after determining that the data structure does not include information on the requested qualifying base table row and if the offset number of rows from the row in the data structure addressed by the pointer is more than one row beyond a last row in the data structure, and wherein the program code is further capable of causing the processor to perform:

locating multiple qualifying base table rows following the second pointer;

adding information on the located multiple qualifying base table rows to corresponding added rows in the data structure; and positioning the first pointer to the last row in the data structure after row are added to the data structure to include information on the multiple located base table rows, wherein the last row in the data structure includes information on the requested qualifying base table row.

40. The program of claim 39, wherein if the offset specifies one qualifying base table row preceding the qualifying base table row for which information is maintained in the row in the data structure addressed by the first pointer, and wherein the program code is further capable of causing the processor to perform:

positioning the first pointer to the row in the data structure at the offset from the row addressed by the first pointer.

41. The program of claim 36, wherein the FETCH request comprises a FETCH ABSOLUTE request to fetch one qualifying base table row at the offset from a first or last qualifying row in the base table, and wherein the program code is further capable of causing the processor to perform:

scanning the entire base table to locate further qualifying base table rows if the FETCH ABSOLUTE request specifies one base table row at the offset from the last qualifying base table row;

adding information on all located qualifying base table rows to rows in the data structure; and positioning the first pointer to one row in the data structure preceding a last row in the data structure by the specified offset.

42. The program of claim 41, wherein the offset specifies a row from the first row qualifying base table row for which information is not provided in the data structure, and wherein the program code is further capable of causing the processor to perform:

locating one or more qualifying base table rows following the second pointer;

adding information on the located multiple qualifying base table rows to corresponding added rows in the data structure; and positioning the first pointer to the row in the data structure following the first row in the data structure by the specified offset.

43. The program of claim 31, wherein the method for accessing data is implemented in a hand held computing device.

44. The article of manufacture of claim 31, wherein the notification indicates that a result set including all qualifying base table rows is complete.

45. The article of manufacture of claim 31, wherein the notification is provided in response to adding information on a first qualifying base table row to the data structure.

* * * * *

UNITED STATES PATENT AND TRADEMARK OFFICE
CERTIFICATE OF CORRECTION

PATENT NO. : 6,856,996 B2 Page 1 of 1
APPLICATION NO. : 09/822899
DATED : February 15, 2005
INVENTOR(S) : Jyh-Herng Chow, Ting Yu Leung and Thanh Tan Pham It is certified that error appears in the above-identified patent and that said Letters Patent is hereby corrected as shown below:

Column 10
  Line 59, delete "after row" and insert --after rows--

Column 12
  Line 57, delete "on" after "positioning"

Column 13
  Line 1, insert --in the-- after "row" and before "data"

Column 14
  Line 25, delete "tumor" and insert --cursor--
  Line 60, delete "row" and insert --rows--

Signed and Sealed this

Twenty-sixth Day of December, 2006

JON W. DUDAS
*Director of the United States Patent and Trademark Office*